United States Patent [19]

Petrán et al.

[11] Patent Number: 4,919,516

[45] Date of Patent: Apr. 24, 1990

[54] OPTICAL TANDEM SCANNING SYSTEM USING A KOESTERS REFLECTING PRISM FOR LIGHT SPLITTING

[75] Inventors: Mojmír Petráň; Milan Hadravsk, both of Plzeň, Czechoslovakia

[73] Assignee: Jednotne Zemedelske Druzstvo "Vitezny Unor" Se Sidlem V Komorne, Blovice, Czechoslovakia

[21] Appl. No.: 220,172

[22] Filed: Jul. 18, 1988

[30] Foreign Application Priority Data

Jul. 24, 1987 [CS] Czechoslovakia ............... 5595-87

[51] Int. Cl.5 ............................................ G02B 23/04
[52] U.S. Cl. ................................... 350/171; 350/527; 350/507; 350/274
[58] Field of Search ............... 350/507, 527, 274, 273, 350/173, 174, 286

[56] References Cited

U.S. PATENT DOCUMENTS

| 2,905,047 | 9/1959 | Vogl | 350/286 |
| 3,517,980 | 6/1970 | Petran et al. | 350/527 |
| 4,061,425 | 12/1977 | Wade | 356/363 |
| 4,575,191 | 3/1986 | Abramovitz | 350/173 |

Primary Examiner—Jon W. Henry
Attorney, Agent, or Firm—Waldron & Associates

[57] ABSTRACT

A system for light splitting particularly suitable for microscopic investigation of living tissues using the so called confocal or tandem scanning by a scanning disk with a number of spirally arranged elementary holes similar to a Nipkow disk. This system for light splitting uses a Koesters reflecting prism having a semi-transparent mirror coating between two parts of said prism. According to this invention this semi-transparent mirror coating is parallel with illuminating pencils of rays striking the prism and with image pencils of rays leaving the prism.

5 Claims, 1 Drawing Sheet

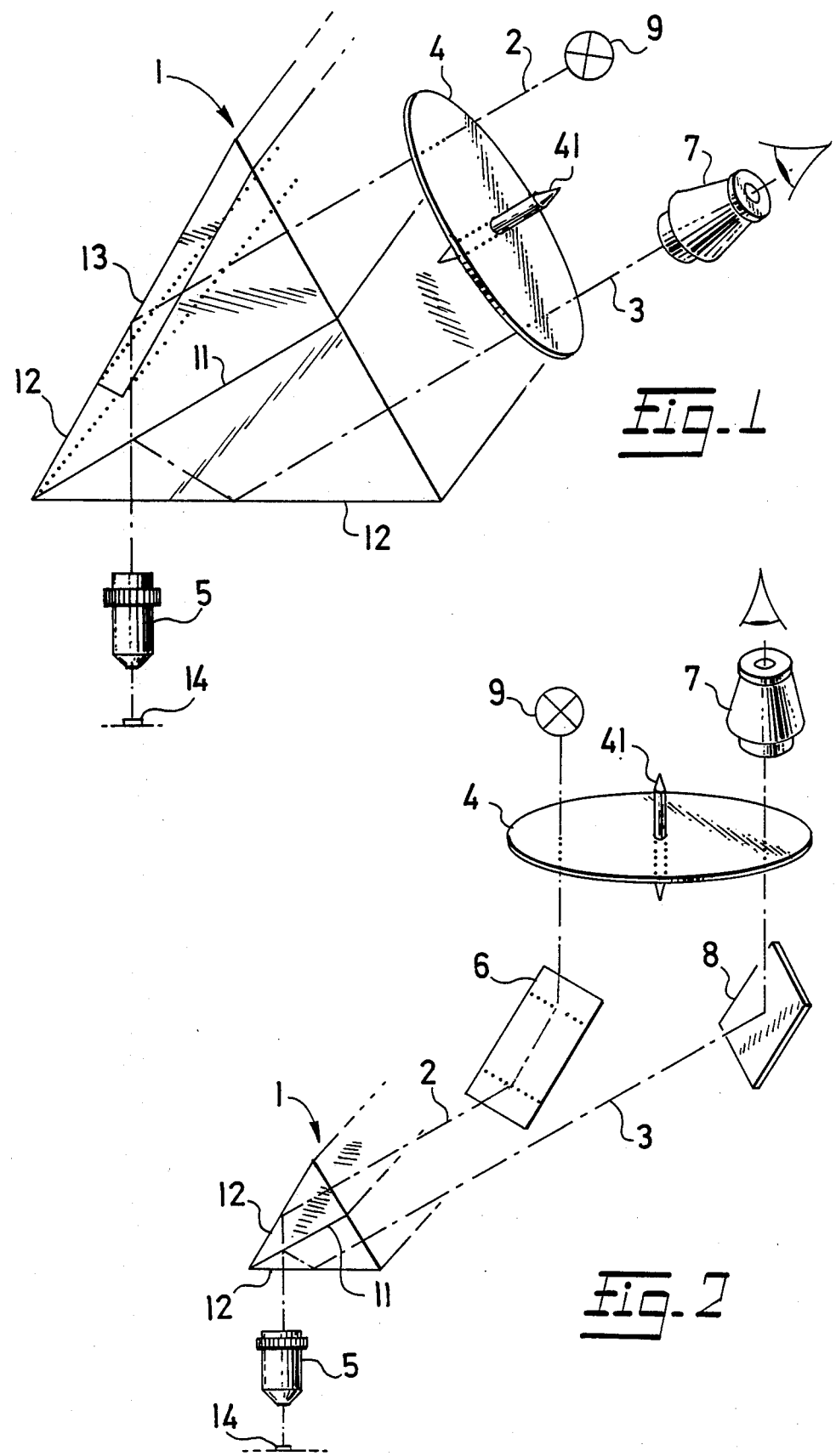

OPTICAL TANDEM SCANNING SYSTEM USING A KOESTERS REFLECTING PRISM FOR LIGHT SPLITTING

BACKGROUND OF THE INVENTION

The invention relates to a system for light splitting particularly suitable for microscopic investigation of living tussues using the so called confocal or tandem scanning by a scanning disk with a number of spirally arranged elementary holes similar to a Nipkow disk where the investigated object is illuminated spot by spot from a light source through holes of a scanning disk and light reflected from the object passes through an elementary hole of the scanning disk situated with respect to the rotation axis of the scanning disk diametrically to the elementary hole of said disk, used for illumination of the object. A similar system is described in the British publication "Scanning" Vol. 7, pages 97 to 108 from 1985, and in U.S. Pat. No. 3,517,980 incorporated herein by reference.

Systems for light splitting applied for similar microscopes are usually provided with a prism with a semitransparent mirror coating. Other systems use a mirror with a semitransparent reflecting surface. In case prisms are applied, the contrast of the image is substantially reduced due to disturbing reflections. This drawback has been eliminated by application of a semi-transparent mirror of minute thickness. The technology and non uniformity of used materials for said mirrors reduced however the optical properties of systems provided with similar mirrors.

Both the prism with a semitransparent mirror coating and the semitransparent mirror are part of a system for light splitting provided with additional prisms or mirrors. Their mutual correct alignment and adjustment together with other optical elements are main requirements for a correct functioning of microscopes provided with said systems. The number of optical elements required for a thus arranged system for light splitting reduces the contrast of the resulting image and increases the possibility of some failure due to the number of components.

In some cases a prism is used for light splitting, to which the light for the investigated object is supplied in the shape of two pencils of rays by two tube lenses behind the objective. Pencils of rays leaving the prism are rectified by a couple of mirrors to the image plane provided with a Fresnel condensing lens and a diversion plate. A thus designed system for light splitting is part of a microscope for stereoscopic reproduction.

SUMMARY OF THE INVENTION

It is an object of this invention to provide a system for light splitting which would enable the maintenance of a maximum contrast of the image without other disturbing influences. According to this invention a so called Koesters reflection prism is applied for this purpose provided with a semitransparent mirror coating between two parts of said prism, said transparent mirror coating being parallel with illuminating pencils of rays impinging on said prism and with image pencils of rays leaving said prism after being reflected from the investigated object. An objective transmitting the light to the investigated object and returning the light reflected from this object to an eyepiece for observation, is aligned against one of reflecting surfaces of the prism. The semitransparent mirror coating of the prism can be advantageously parallel with the rotation axis of the scanning disk. In order to align the image of the investigated object properly, one of the reflecting surfaces of the prism can be replaced by a roof shaped configuration or a reversing system can be introduced in the path of either the illuminating pencils of rays of the image pencils of rays.

By adjustment of the Koesters reflecting prism with its semitransparent mirror coating parallel with both illuminating and image pencils of rays, the number of elements of the light splitting system has been substantially reduced against actually known systems. A thus arranged system is compact and its optical properties are not variable.

DESCRIPTION OF DRAWINGS

Exemplary embodiments of the object of this invention are in the attached drawings indicated diagrammatically, whereby FIG. 1 shows an arrangement where the semitransparent mirror coating of the Koesters prism is parallel with the rotation axis of the scanning disk, FIG. 2 an alternative arrangement with the rotation axis of the scanning disk inclined with respect to the semitransparent coating of the Koesters reflection prism.

DESCRIPTION OF PREFERRED EMBODIMENTS

With reference to FIG. 1 the arrangement comprises a light source 9, a scanning disk 4 with spirally arranged elementary openings, rotating about its rotation axis 41, a Koesters refection prism 1 consisting of two prism parts, with a semitransparent mirror coating 11 between both said parts, an objective 5 of the microscope concentrating the light of the investigated object 14 and an eyepiece 7 of the microscope enabling observation of the image of the object 14. The Koesters reflection prism 1 is provided with planar reflection surfaces 12 which secure a total reflection capability in case pencils of rays strike said surfaces at an acute angle. In FIG. 1 the semitransparent mirror coating 11 of the prism 1 is parallel with the rotation axis 41 of the scanning disk 4. In FIG. 1 furthermore at least a part of the upper reflecting surface 12 of the prism 1 is replaced by two, mutually rectangular roof shaped parts 13, the task of which is a correct alignment of the image of the investigated object 14.

In FIG. 2 the semitransparent mirror coating 11 of the prism 1 is inclined with respect to the rotation axis 41 of the scanning disk 4, both reflection surfaces 12 of the prism 1 are planar and an inversing system 6 is provided in the path of illuminating pencils 2 of rays taking over the task of the roof shaped parts 13 of prism 1 from FIG. 1. A mirror 8 is furthermore arranged in the path of image pencils 3 of rays. The inversing system 6 can be equally provided in the path of image pencils 3 of rays, while the mirror 8 would be in the path of illuminating pencils 2 of rays.

In operation in case of the arrangement as in FIG. 1, the light source 9 illuminates a part of the scanning disk 4 and elementary openings of said disk 4 allow illuminating pencils 2 of rays to pass through this disk and to enter the prism 1 where they strike the roof shaped parts 13 of said prism 1 which reflect said illuminating pencils 2 of rays through the semitransparent mirror coating 11 and through the lower reflecting surface 12 of the prism 1 whereafter they enter the objective 5 and illuminate the investigated object 14. Image pencils 3 of rays reflected from the investigated object 14 are returned to the objective 5, enter again by way of the lower reflecting surface 12 the prism 1 and are reflected by the semitransparent mirror coating 11 of prism 1 back to the lower surface 12 of the prism 1 where they are again reflected in a direction parallel with the semitransparent mirror coating 11, in which direction they leave the prism and by way of an opening of the scanning disk 4 diametrically situated with respect to the rotation axis 41 against the elementary opening thereof, through which said pencils of rays passed originally the image pencils 3 of rays enter the eyepiece 7 of the microscope for observation of the image.

In case of the altenative shown in FIG. 2 where the prism 1 has no roof shaped parts 13 which provide an invesion effect of the image, an invesion system 6 is inserted in the path of the illuminating pencil 2 of rays and a mirror 8 in the path of the image pencil 3 of rays. Their place can be of course mutually reversed.

Similarly, the roof shaped parts 13 of one of the reflecting surfaces 12 of the prism 1 can be also provided at the lower reflecting surface 12 thereof, it is however necessary that a part of the surface 12 remains planar in order to allow free passage of both the illuminatimh pencil 2 of rays and the image pencil 3 of rays reflected from the investigated object 14.

INDEX OF REFERENCE MARKS

1. Koesters reflection prism
2. illuminating pencil of rays
3. image pencil of rays
4. scanning disk
5. objective of microscope
6. optical reversing system
7. eyepiece of microscope
8. mirror
9. light source
11. semitransparent mirror coating of prism 1
12. reflecting surfaces of prism 1
13. roof shaped parts of prism 1
41. rotation axis of scanning disk 4

I claim:

1. In a device for optical tandem scanning of an object having an arrangement for illumination and scanning of an object by means of a rotating scanning disk having diametrically opposed, spirally arranged elementary openings and an axis of rotation, and a light splitting system, and wherein an illuminating light ray is passed through a first elementary opening in said rotating disk and passed into said light splitting system whereby a portion of said light ray is passed therethrough and through an objective to the object, and an image light ray is reflected from said object back through said objective to said light splitting system wherein said light splitting system will reflect a portion of said image light ray through a second elementary opening on said disk, and then passed to where an image of said object can be viewed;

the improvement comprising a light splitting system comprising a Koesters reflecting prism of the type having an interface between a first and second component part thereof, wherein each component part has a first surface perpendicular to said interface and a second surface at an acute angle to said interface, said prism having a semitransparent mirror coating at said interface and oriented such that said interface is parallel to said axis of rotation of said disk, and said illuminating light rays enter said first component part of said prism through said first surface thereof and parallel to said interface, and then reflected from said second surface and out of said prism and through said objective and to said object, and the image light rays are reflected from said object back through said objective and into said second component part of said prism through said second surface thereof and a portion thereof reflected from said interface back to said second surface of said second component part, and there reflected to pass parallel to said interface and emerge from said prism through said first surface of said second component part, and such that all light rays entering and emerging from said prism enter and emerge perpendicularly through said first and second surfaces.

2. A device according to claim 1 wherein said second surface of said first component part of said prism is formed by a mutually perpendicular roof shaped reflecting surface.

3. A device according to claim 1 wherein said second surface of said second component part of said prism is formed by a mutually perpendicular roof shaped reflecting surface.

4. A device according to claim 1 wherein said illuminating light ray is passed through an optical reversing system before it is passed into said prism.

5. A device according to claim 1 wherein said image light ray is passed through an optical reversing system after it emerges from said prism.

* * * * *